United States Patent
Bae et al.

(10) Patent No.: US 12,390,892 B2
(45) Date of Patent: Aug. 19, 2025

(54) WELDING WIRES FOR OBTAINING GIGA-GRADE WELDS, WELDED STRUCTURES MANUFACTURING USING SAME, AND WELDING METHOD THEREOF

(71) Applicant: POSCO, Pohang-si (KR)

(72) Inventors: Gyu-Yeol Bae, Incheon (KR); Hong-Chul Jeong, Pohang-si (KR)

(73) Assignee: POSCO, Pohang-si (KR)

( * ) Notice: Subject to any disclaimer, the term of this patent is extended or adjusted under 35 U.S.C. 154(b) by 402 days.

(21) Appl. No.: 17/790,801

(22) PCT Filed: Apr. 23, 2021

(86) PCT No.: PCT/KR2021/005162
§ 371 (c)(1),
(2) Date: Jul. 5, 2022

(87) PCT Pub. No.: WO2021/221393
PCT Pub. Date: Nov. 4, 2021

(65) Prior Publication Data
US 2023/0356334 A1    Nov. 9, 2023

(30) Foreign Application Priority Data

Apr. 28, 2020  (KR) .................. 10-2020-0051506
Apr. 8, 2021   (KR) .................. 10-2021-0045896

(51) Int. Cl.
*B23K 35/30*      (2006.01)
*B23K 9/173*      (2006.01)
(Continued)

(52) U.S. Cl.
CPC .......... *B23K 35/3086* (2013.01); *B23K 9/173* (2013.01); *B23K 9/23* (2013.01);
(Continued)

(58) Field of Classification Search
CPC ...... B23K 35/3086; B23K 9/173; C22C 38/38
See application file for complete search history.

(56) References Cited

U.S. PATENT DOCUMENTS 3,975,610 A * 8/1976 Bagshaw ............. B23K 35/308
                                                    219/76.14
2016/0008906 A1   1/2016 Zeniya et al.
(Continued)

FOREIGN PATENT DOCUMENTS

CN    110549031 A    12/2019
JP    H02-118026 A    5/1990
(Continued)

OTHER PUBLICATIONS

Translation of JP-08108281-A (Year: 1996).*
(Continued)

*Primary Examiner* — Elizabeth M Kerr
(74) *Attorney, Agent, or Firm* — Morgan Lewis & Bockius LLP (57) ABSTRACT

A welding wire for obtaining a giga-grade weld, a welded structure manufactured using same, and a welding method thereof are provided. The welding wire of the present invention comprises: by mass % of the whole wire, 0.08 to 0.15% of C; 0.001% to 0.1% of Si; 1.6 to 1.9% of Mn; 0.015% or less of P; 0.015% or less of S; 4.0 to 5.2% of Cr; 0.4 to 0.65% of Mo, and the remainder being Fe and unavoidable impurities, wherein value X defined by the following relation 1 satisfies the range of 0.7 to 1.1%.
[Relational Expression 1] X (%)=[Cr]/10+[Mo]−4x[Si]/[Mn].

18 Claims, 8 Drawing Sheets

(51) Int. Cl.
    *B23K 9/23*     (2006.01)
    *B23K 35/02*     (2006.01)
    *B23K 101/18*     (2006.01)
    *B23K 101/34*     (2006.01)
    *B23K 103/04*     (2006.01)
    *C22C 38/00*     (2006.01)
    *C22C 38/02*     (2006.01)
    *C22C 38/22*     (2006.01)
    *C22C 38/38*     (2006.01)

(52) U.S. Cl.
    CPC ........ *B23K 35/0261* (2013.01); *C22C 38/002* (2013.01); *C22C 38/02* (2013.01); *C22C 38/22* (2013.01); *C22C 38/38* (2013.01); *B23K 2101/18* (2018.08); *B23K 2101/34* (2018.08); *B23K 2103/04* (2018.08)

(56) References Cited

U.S. PATENT DOCUMENTS

| | | |
|---|---|---|
| 2019/0126409 A1 | 5/2019 | Seo et al. |
| 2019/0232411 A1 | 8/2019 | Yashima et al. |
| 2020/0039006 A1 | 2/2020 | Yashima et al. |
| 2020/0114453 A1 | 4/2020 | Kinashi et al. |
| 2021/0086313 A1 | 3/2021 | Kodama et al. |

FOREIGN PATENT DOCUMENTS

| | | | |
|---|---|---|---|
| JP | 08108281 A | * | 4/1996 |
| JP | H08-108281 A | | 4/1996 |
| JP | 2002-239646 A | | 8/2002 |
| JP | 2005-146407 A | | 6/2005 |
| JP | 2007-296541 A | | 11/2007 |
| JP | 2008-221297 A | | 9/2008 |
| JP | 2019-882 A | | 1/2019 |
| JP | WO2019/124305 A1 | | 6/2019 |
| JP | 2019-107697 A | | 7/2019 |
| KR | 10-1999-014807 A | | 2/1999 |
| KR | 10-2000-0034959 A | | 6/2000 |
| KR | 10-0470664 B1 | | 3/2005 |
| KR | 10-2008-0106330 A | | 12/2008 |
| KR | 10-2009-0007783 A | | 1/2009 |
| KR | 10-1115790 B1 | | 3/2012 |
| KR | 10-1379973 A | | 4/2014 |
| KR | 10-2015-0108930 A | | 9/2015 |
| KR | 10-2016-0034585 A | | 3/2016 |
| KR | 10-2016-0052866 A | | 5/2016 |
| KR | 10-2016-0052868 A | | 5/2016 |
| KR | 10-2016-0080096 A | | 7/2016 |
| KR | 10-2019-0021384 A | | 3/2019 |
| KR | 10-2019-0047388 A | | 5/2019 |
| KR | 10-2019-0134703 A | | 12/2019 |
| KR | 10-0338705 A | | 10/2022 |
| WO | 2017/221470 A1 | | 12/2017 |
| WO | 2018/203513 A1 | | 11/2018 |

OTHER PUBLICATIONS

International Search Report dated Jun. 3, 2021 issued in International Patent Application No. PCT/KR2020/018455 (with English translation).
European Search Report dated Sep. 19, 2023 issued in European Patent Application No. 21795496.5.
Japanese Office Action dated Sep. 26, 2023 issued in Japanese Patent Application No. 2022-552279.
International Search Report dated Jul. 29, 2021 issued in International Patent Application No. PCT/KR2021/005162 (with English translation).
Indian Office Action dated Jan. 9, 2023 issued in Indian Patent Application No. 202217041848 (with English translation).

* cited by examiner

| WIRE No. | CLASSIFI-CATION | X VALUE (%) | ALLOYED GALVANIZED WELDED PORTION RT | GALVANIZED WELDED PORTION RT |
|---|---|---|---|---|
| 36 | COMPARATIVE EXAMPLE | 0.15 |  |  |
| 34 | COMPARATIVE EXAMPLE | 0.63 |  |  |
| 12 | INVENTIVE EXAMPLE | 0.70 |  |  |
| 5 | INVENTIVE EXAMPLE | 1.10 |  |  |
| 7 | INVENTIVE EXAMPLE | 0.85 |  |  |

WELDING WIRES FOR OBTAINING GIGA-GRADE WELDS, WELDED STRUCTURES MANUFACTURING USING SAME, AND WELDING METHOD THEREOF

CROSS-REFERENCE OF RELATED APPLICATIONS

This application is the U.S. National Phase under 35 U.S.C. § 371 of International Patent Application No. PCT/KR2021/005162, filed on Apr. 23, 2021, which in turn claims the benefit of Korean Application Nos. 10-2020-0051506, filed on Apr. 28, 2020 and 10-2021-0045896, filed on Apr. 8, 2021, the entire disclosures of which applications are incorporated by reference herein.

TECHNICAL FIELD

The present disclosure relates to a welding wire for gas-shielded arc welding of galvanized giga steel having a tensile strength of 1 GPa or more and a thickness of 6 mm or less applied to structural members of a lower body of a vehicle, a welded structure manufactured using the same, and a welding method thereof.

BACKGROUND ART

In the automobile field, research into light-weight technology for car bodies and parts is emerging as a major issue due to fuel efficiency regulation policies, in accordance with environmental protection for issues such as global warming. Chassis parts, important for automobile driving performance, also require the application of a high-strength steel material for weight reduction in accordance with this principle.

In order to achieve the weight reduction of such parts, it is essential to increase the strength of the material, and it is an important factor to guarantee durability of parts made of a high-strength steel material in an environment in which repeated fatigue loads are applied.

However, in the case of arc welding, which is mainly used to secure strength when assembling automobile chassis parts, since overlap joint welding is performed between parts by welding with a welding wire, it is inevitable to provide a joint portion with a geometric shape. This acts as a repetitive fatigue stress concentration portion (notch effect) and becomes a fracture starting point, resulting in deterioration of durability of the parts.

Therefore, it is most important to reduce an angle (toe angle) of a bead end portion, which is mainly a stress concentration portion, in order to improve fatigue characteristics of the welded portion. In addition, it can be said that it is an important factor to control a material and stress of the toe portion. In addition, as described above, due to thinning of the material due to high strength and weight lightning of parts, demand for rust prevention for penetration corrosion is increasing, so adoption of a plated steel material is increasing, but in particular, there is no plating layer in welded metal in the arc welded portion, so corrosion resistance after coating may be inferior, as compared to a base material. Accordingly, there is a problem leading to deterioration of fatigue properties along with the occurrence of premature corrosion of the welded portion of chassis parts made of a plated steel sheet in severely corrosive environments when driving a vehicle. Meanwhile, pore defects in the form of pits and blow holes in a weld bead are generated in large quantities due to generation of steam such as zinc, or the like during gas-shielded arc welding of plated steel materials, which may decrease the strength of the welded portion, thereby reducing welding productivity. In addition, in the case of general non-plated steel materials, slag generated on the weld bead during gas-shielded arc welding may cause plating defects and may be a factor in lowering corrosion resistance after plating. So, when manufacturing parts, there may be a problem in that costs may increase due to post-treatment processes such as pickling or brushing for slag removal after welding. Meanwhile, in order to effectively reduce weight in preparation for the era of electric vehicles, it is expected that the application of giga steel having tensile strength of 1 GPa or more will be expanded, so securing the strength of the welded portion is an important priority.

As an example of the prior art for solving such a problem, the invention described in Patent Document 1 is mentioned. In Patent Document 1, it is disclosed that blowhole and a slag area ratio of the welded portion may be controlled within 10%, respectively, through appropriate control of the contents of Si, Mn, Ti and Al of the gas-shielded arc welding wire. However, in the case of an actual high-strength steel material, when the blowhole area ratio of the welded portion exceeds 5%, the tensile strength and fatigue strength of the welded metal may be significantly reduced, and in particular, in the case of a giga-grade steel material having tensile strength of 1 GPa or more, a problem of relatively greater sensitivity to a decrease in the strength of the welded metal occurs due to the occurrence of blowholes.

Patent Document 2 discloses that it is possible to secure tensile strength of 800 MPa or more of a welded metal portion by controlling a carbon equivalent of the gas-shielded arc welding wire to 0.8 to 0.9%, but a method for reducing blowholes and slag in a welded portion is not suggested.

Patent Document 3 discloses that formation of Si-based slag in a weld bead is suppressed to improve platability and porosity of the welded portion by controlling a content ratio of Si and Mn of the gas-shielded arc welding wire to an appropriate range. However, in Patent Document 3, maximum strength of the welded portion is 540 MPa for general steel materials, and there is a limitation in which a method for securing strength in the welded portion of giga steel having tensile strength of 1 GPa or more is not provided.

Patent Document 4 discloses that a slag area ratio of the welded portion may be controlled within 5% through appropriate control of the contents of Si, Al, Ti, Al, Sb and S of the gas-shielded arc welding wire, but a method reducing pits and blowholes in plated steel materials in welded portion is not suggested. Meanwhile, although a method for improving the strength of the welded portion is proposed by adding an appropriate amount of B to the wire, there is a limitation in which the strength does not reach 1 GPa grade or more.

Patent Document 5 discloses that a total amount of Cr and Ni of the welding wire is controlled to 1% to 24%, so that weld strength of the steel material having tensile strength of 980 MPa or more is 90% or more compared to a base material, but there is a limitation in which a method for reducing slag and improving porosity of the welded portion is not proposed.

That is, the invention disclosed in Patent Documents Nos. 1 to 5 does not sufficiently consider welding of a galvanized steel sheet having tensile strength of 1 GPa or more and a plating amount per side of 20 to 120 $g/m^2$, so that it was unclear whether sufficient strength could be secured for a giga steel welded portion, slag reduction and porosity resistance were simultaneously secured.

PRIOR ART DOCUMENT

Patent Document (Patent Document 1) Korean Patent Publication No. 2015-0108930
(Patent Document 2) Korean Patent Publication No. 2016-0080096
(Patent Document 3) Korean Patent Publication No. 2019-0047388
(Patent Document 4) International Patent Publication No. WO2019-124305
(Patent Document 5) Korean Patent Publication No. 2019-0134703

SUMMARY OF INVENTION

Technical Problem

An aspect of the present disclosure is to provide a welding wire that can be applied gas-shielded arc welding of galvanized giga steel having a tensile strength of 1 GPa or more and a thickness of 6 mm or less applied to structural members of a lower body of a vehicle, a welded structure manufactured using the same, and a welding method thereof.

The subject of the present invention is not limited to the above. The subject of the present invention will be understood from the overall content of the present specification, and those of ordinary skill in the art to which the present invention pertains will have no difficulty in understanding the additional subject of the present invention.

Solution to Problem

According to an aspect of the present disclosure, a gas-shielded arc welding wire includes:
by mass % of a whole wire, 0.08 to 0.15% of C; 0.001% to 0.1% of Si; 1.6 to 1.9% of Mn; 0.015% or less of P; 0.015% or less of S; 4.0 to 5.2% of Cr; 0.4 to 0.65% of Mo, and a remainder of Fe and unavoidable impurities, wherein a value X defined by the following Relational Expression 1 satisfies a range of 0.7 to 1.1%.

$$X\ (\%) = [Cr]/10 + [Mo] - 4x[Si]/[Mn]$$ [Relational Expression 1]

Here, in Relational Expression 1, [Cr], [Mo], [Si] and [Mn] represent mass % of each element.

A Cu plating layer may be formed on a surface of the welding wire.

Cu comprising the Cu plating layer, by mass % of a total wire including a plating layer, preferably has a content of 0.4% or less (excluding 0%), more preferably, limited to a content in a range of 0.1 to 0.3%.

It is preferable that the welding wire contain, by mass %, 4.2 to 4.9% to Cr, 0.45 to 0.48% of Mo, and 1.65 to 1.75% of Mn, respectively.

The welding wire preferably includes, a Si content in a range of 0.04 to 0.08%.

The welding wire may be a solid wire for gas-shielded arc welding.

In addition, according to another aspect of the present disclosure,
a welded structure has a welded portion obtained by welding two or more welding base materials using the welding wire, wherein the welded portion has a microstructure comprising, by area %, 30 to 50% of martensite, 50 to 70% of bainite, and the remainder of less than 5% of retained austenite, the microstructure comprising the welded portion has an average effective grain size of 1 to 3 μm, and a grain fraction having a high angle grain boundary of 47° or more of 35% or more.

At least one of the welding base materials may be a galvanized steel sheet.

The galvanized steel sheet may be one of an electro-galvanized steel sheet, a hot-dip galvanized steel sheet, and a galvannealed steel sheet.

A base steel sheet comprising the galvanized steel sheet, may contain, by mass %, at least one of 0.2 to 0.9% of Cr and 0.1 to 0.2% of Mo.

In addition, according to another aspect of the present disclosure,
as a method of gas-shielded arc welding of a welding base material using the welding wire, wherein, in the gas-shielded arc welding method, 5 to 20% $CO_2$ is mixed with Ar as a protective gas during the welding and used, and when a thickness of the welding base material is t (mm), welding is performed so that a range of a welding heat input Q (kJ/cm) defined by the following Relational Expression 2 satisfies $1.15t \le Q \le 1.6t$.

$$Q = (I \times E) \times 0.048/\upsilon$$ [Relational Expression 2]

Here, in Relational Expression 2, I, E, and υ represent a welding current [A], a welding voltage [V], and a welding speed (cm/min), respectively.

The welding wire may be a solid wire having a diameter of 0.9 to 1.2 mm.

Advantageous Effects of Invention

According to the present disclosure having the above configuration, by reducing a slag area ratio and a blowhole area ratio of a gas-shielded arc welded portion of giga steel having tensile strength of 1 GPa or more and a thickness of 6 mm or less, to 1%, respectively, it is possible to omit a separate post-treatment process such as pickling, brushing, or the like, for removing slag in the welded portion, and furthermore, it is possible to secure excellent platability, thereby reducing manufacturing costs and improving quality in industrial manufacturing sites.

In addition, there is an advantage in that it is possible to effectively prevent pit and blow hole defects during welding of plating materials, and to secure 1 GPa or more of strength in the welded portion without fracturing the welded metal or fusion line.

Therefore, it can have industrial significance in that it can expand the adoption of giga steel by satisfying a need for improving rust resistance and durability according to high strength and thinning parts such as automobile chassis members, or the like.

BRIEF DESCRIPTION OF DRAWINGS

FIG. 7 (A-B) is a diagram illustrating a change in load in the welded portion (b) compared to a change in load in the steel material, which is a welding base material (a), when a high-speed tensile test (tensile speed of 1 m/s and 15 m/s, respectively) was performed by applying a load to the welded portion obtained from Inventive Example [X (%)=0.85, Q(kJ/cm)=2.6] in which a No. 7 wire and a No. 1 steel material are combined and welded, in Example 2 of the present disclosure.

BEST MODE FOR INVENTION

Hereinafter, the present disclosure will be described.

In the present disclosure, when gas-shielded arc welding for giga steel having tensile strength of 1 GPa or more and thickness of 6 mm or less is performed, it is possible to reduce a slag area ratio and a blowhole area ratio of the welded portion to less than 1%, respectively, and to secure the strength in the welded portion of 1 GPa or more without fracturing welded metal or a fusion line. To this end, as a result of repeated experiments and studies by the present inventors, it was confirmed, among the components of the welding wire used for gas-shielded arc welding, it is effective to control the contents of Cr and Mo, which are reinforcing elements for strength improvement, and Si, Mn, which are deoxidation elements, so that an X value defined by Relation 1 satisfies a range of 0.7 to 1.1%.

The present inventors found that, when the value of Relation 1 is used as a parameter, the X value has a great influence on weld slag, blowhole generation, and weld strength. In particular, as a component included in the welding wire, not only control of an individual content of each element, but also control each component amount thereof so that the value of X is in a range of 0.7 to 1.1%, so that it was confirmed that it is possible to reliably suppress the occurrence of slag and blowholes in the weld bead, and secure the strength of the welded portion without fracturing the welded metal or the fusion line by 1 GPa or more, to present the present disclosure.

Therefore, according to an aspect of the present disclosure, a welding wire includes, by mass %: C: 0.08 to 0.15%, Si: 0.001% to 0.1%, Mn: 1.6 to 1.9%, P: 0.015% or less, S: 0.015% or less, Cr: 4.0 to 5.2%, Mo: 0.4 to 0.65%, the remainder including Fe and unavoidable impurities, wherein a value X defined by the above relation 1 satisfies a range of 0.7 to 1.1%.

Hereinafter, according to an aspect of the present disclosure, the component composition of the gas-shielded arc welding wire, and a reason for limitation thereof, will be described, where, % is mass % unless otherwise specified. Meanwhile, in the present disclosure, a welding wire is not limited to a specific type of a wire thereof, and it can be used for a solid wire or a flux-cored wire, and is preferably used as a solid wire. It is preferable that a Cu plating layer is formed on a surface of the welding wire.

[C: 0.08 to 0.15%]

C is a component stabilizing arc and acting to atomizing a melting droplet. However, if a C content is less than 0.08%, the melting droplet becomes large and the arc becomes unstable, an amount of spatter generation increases, and it may be difficult to secure sufficient strength of giga-grade steel welded metal having tensile strength of 1 GPa or more. On the other hand, when the C content exceeds 0.15%, viscosity of molten metal is lowered, so that a bead shape becomes defective, and the welded metal is excessively hardened, thereby increasing brittleness. Therefore, in the present disclosure, it is preferable to limit the C content of the welding wire to 0.08 to 0.15%.

[Si: 0.001 to 0.1%]

Si is an element (deoxidation element) promoting deoxidation of molten metal during arc welding, and is effective in suppressing occurrence of blowholes. Meanwhile, when Si is contained excessively, Si is an element which generates slag in a remarkably large amount and causes a welded portion plating defect. When a Si content is less than 0.001%, deoxidation becomes insufficient and blowholes is easily generated, and when the Si content exceeds 0.1%, slag increases remarkably. Therefore, the Si content of the solid wire for welding was in a range of 0.001 to 0.1% in a consideration of a balance between suppression of generation of blowholes and suppression of a slag amount.

In addition, it is preferable that the Si content is limited to a range of 0.04 to 0.08% in terms of being able to more effectively balance the suppression of blowholes and the amount of slag.

[Mn: 1.6 to 1.9%]

Mn is also a deoxidizing element and has an effect of promoting deoxidation of molten metal during arc welding and suppressing generation of blowholes, but, meanwhile, Mn is also an element increasing viscosity of molten metal. When a Mn content is less than 1.6%, deoxidation becomes insufficient within an appropriate range of the above-described Si content, and blowholes are likely to be generated. Meanwhile, if the Mn content exceeds 1.9%, the viscosity of the molten metal becomes excessively high, and when a welding speed is high, the molten metal cannot flow properly into a welded site, resulting in a humped bead, which is likely to cause a poor bead shape. Therefore, the Mn content of the welding wire was in a range of 1.6 to 1.9%. In addition, in order to reliably suppress the occurrence of blowholes, it is preferable to limit the Mn content within a range of 1.65 to 1.75%.

[Cr: 4.0 to 5.2%]

Cr is a ferrite stabilizing element, and is a hardening element improving strength of welded metal. In particular, it is necessary to limit a Cr content to a range of 4.0 to 5.2% in order to secure sufficient strength of the giga-grade steel welded metal having tensile strength of 1 GPa or more. If the Cr content is less than 4.0%, a problem of insufficient strength of the giga-grade steel welded metal tends to occur. On the other hand, when the Cr content exceeds 5.2%, there is an increased risk of formation of a 5 ferrite structure or precipitation of chromium carbide in the structure, resulting in embrittlement of the welded metal, that is, a decrease in toughness. In addition, it is preferable that the Cr content is limited to a range of 4.2 to 4.9%, in terms of being able to more effectively achieve both securing sufficient strength and suppressing of embrittlement of the welded metal.

[Mo: 0.4 to 0.65%]

Mo is also a ferrite stabilizing element, and is a hardening element improving strength of welded metal. In particular, it is necessary to limit a Mo content in a range of 0.4 to 0.65% in order to secure sufficient strength of giga-grade steel material welded metal having tensile strength of 1 GPa or more. If the Mo content is less than 0.4%, it is difficult to obtain sufficient strength of the giga-grade steel material welded metal having tensile strength of 1 GPa or more within the above-described appropriate component range, and if the Mo content exceeds 0.65%, toughness of the welded metal may decrease. In addition, it is preferable that the Mo content be limited to a range of 0.45 to 0.48% in terms of being able to more effectively achieve both securing sufficient strength and suppressing of embrittlement of the welded metal.

[P: 0.015% or Less]

P is an element that is generally incorporated as an unavoidable impurity in steel, and is usually included as an impurity in an arc welding wire. Here, P is one of main elements causing high-temperature cracking of welded metal, and it is preferable to suppress P as much as possible, and when a P content exceeds 0.015%, high-temperature cracking of the welded metal becomes remarkable. Therefore, in the present disclosure, it is preferable to limit the P content of the welding wire to 0.015% or less.

[S: 0.015% or Less]

S is also generally incorporated as an unavoidable impurity in steel, and is usually included as an impurity in a solid wire for arc welding as well. Here, S is an element inhibiting toughness of welded metal, and it is preferable to suppress S as much as possible. When a S content exceeds 0.015%, toughness of the welded metal deteriorates. Therefore, in the present disclosure, it is preferable to limit the S content of the welding wire to 0.015% or less.

[Relational Expression 1]

In addition, in the gas-shielded arc welding wire of the present disclosure, it is important to control the contents of Cr, Mo, Si, and Mn so that a X value defined by the following Relational Expression 1 satisfies a range of 0.7 to 1.1%.

$$X (\%)=[Cr]/10+[Mo]-4x[Si]/[Mn]$$ [Relational Expression 1]

Here, in Relational Expression 1, [Cr], [Mo], [Si] and [Mn] represent mass % of each element.

That is, according to the research results of the present inventors, it was found that the contents of Cr, Mo, Si and Mn contained in the wire strongly correlated not only with the weld strength, but also with the generation of blowholes and slag, so Relational Expression 1 was conceived. Specifically, by controlling the contents of Cr, Mo, Si, and Mn so that the X value defined by the above relation 1 satisfies a range of 0.7 to 1.1%, sufficient strength of the giga-grade steel material welded portion having tensile strength of 1 GPa or more may be secured and porosity resistance improvement and slag reduction may be certainly obtained. That is, by applying the above Relational Expression 1 parameter, it is possible to reliably suppress occurrence of slag and blowholes in a weld bead, and it is possible to secure strength of the welded portion of 1 GPa or more without fracturing the welded metal or the fusion line.

If the X value is less than 0.7%, it is difficult to secure sufficient strength of the welded metal as well as the porosity and slag reduction effects of the giga-grade steel material welded portion described above, and conversely, if the X value exceeds 1.1%, in some cases, even if the porosity resistance and slag reduction effect of the welded portion are satisfied, the welded metal is too brittle, and the fracture of the welded metal or the fusion line may become sensitive, resulting in poor physical properties of the welded portion.

[Impurity]

An impurity is a component contained in a raw material or a component mixed in a manufacturing process, and refers to the component which is not intentionally contained in a welding wire.

It is preferable that a Cu plating layer is formed on a surface of the welding wire of the present disclosure. Cu is generally contained in about 0.02% as an impurity in steel comprising the wire. In the case of the arc welding wire of the present disclosure, it is mainly come from copper plating applied to a surface of the wire.

In an arc welding wire, copper plating is an important surface treatment method for stabilizing wire feedability and conductivity, and, when copper plating is performed, a certain amount of Cu may inevitably be contained.

In the present disclosure, in this case, a Cu content contained in the plating layer is preferably controlled to be 0.4% or less (excluding 0%), by mass % with respect to a total wire including a Cu plating layer. If the content of Cu exceeds 0.4%, crack susceptibility of the welded metal may become high. A more preferable Cu content that can more effectively reduce the crack susceptibility of the welded metal while stabilizing the feedability and conductivity of the wire is to control it in a range of 0.1 to 0.3%. When the Cu content is excessively low, the necessary wire feedability and conductivity may not be obtained.

Next, a welded structure manufactured using the welding wire, which is another aspect of the present disclosure, will be described.

The welded structure of the present disclosure is a welding structure having a welded portion obtained by welding two or more welding base materials using the welding wire, wherein the welded portion has a microstructure comprising, by area %, 30 to 50% of martensite, 50 to 70% of bainite, and the remainder of 5% or less of retained austenite. In addition, the microstructure comprising the welded portion has an average effective grain size of 1 to 3 μm, and a grain fraction having a high angle grain boundary of 47° or more of 35% or more.

First, the welded portion of the present disclosure has a microstructure comprising, by area %, 30 to 50% of martensite, 50 to 70% of bainite, and the remainder of 5% or less of retained austenite. In the present disclosure, if a martensite fraction is excessive, the welded metal may become too hard to be sensitive to brittleness, and if the martensite fraction is too small, there may be a problem that the strength of the welded metal may be insufficient.

Meanwhile, in general, bainite forming a welded portion generated by low-temperature transformation at a temperature of 550° C. or lower may include both upper bainite and lower bainite. In the case of lower bainite, which develops through transformation in the range of 250 to 400° C., there are a large number of grains having high angle grain boundary that are interlocked within prior austenite grains. Therefore, when the lower bainite is mixed with martensite, there is an effect of relatively improving toughness compared to when martensite is present alone.

In consideration thereof, in the present disclosure, a microstructure comprising the welded portion has an average effective grain size of 1 to 3 μm, and a grain fraction having a high angle grain boundary of 47° or more is controlled to 35% or more. If the average effective grain size of the microstructure comprising the welded portion is less than 1 μm, there is a concern that the toughness of the welded metal may be insufficient. Conversely, if it exceeds 3 μm, there is a problem that the strength of the welded metal may be insufficient compared to the giga-grade steel base material. In addition, if the crystal grain fraction having a high angle grain boundary of 47° or more is less than 35%, there is a problem in that the strength and toughness of the welded metal may be reduced.

In addition, the welded portion may have average hardness of 370 to 400 Hv, and tensile strength of 940 MPa or more, preferably, 1 GPa or more, which is 95% or more compared to the welding base material.

In addition, microstructure characteristics of the welded metal may improve mechanical properties of the welded portion, and as described above, when a tensile load is applied, not only fracture of the welded metal or fusion line do not occur, but also sufficient strength and toughness to an extent that the fracture of the welded metal portion does not occur may be secured even in a high-speed collision (high-speed tensile load applied) situation of a vehicle in a range of 3.6 to 54 km/h, in the case of sub-frames that are front collision members.

In the present disclosure, high-speed tensile strength of the welded portion may be 95% and 80% or more, respectively, compared to the base material at tensile speeds of 3.6 km/h and 54 km/h.

Meanwhile, the welded portion of the present disclosure may be obtained by welding two or more welding base materials using the welding wire.

Meanwhile, in the present disclosure, the type or component composition of the steel sheet to be subjected to gas-shielded arc welding using a welding wire is not particularly limited. For example, it is preferable that at least one of the welding base materials is a galvanized steel sheet, which is because the effect becomes remarkable, when gas-shielded arc welding of the galvanized steel sheet is performed using the welding wire of the present disclosure. Specifically, when a galvanized or galvannealed steel sheet having a single-sided plating amount of 20 to 120 g/m$^2$ is used as a base steel sheet, and in particular, when there is no gap in the overlap joint portion during welding and is closely adhered, even in a situation in which zinc vapor cannot be sufficiently discharged before solidification, if the gas-shielded arc welding wire of the present disclosure is used, blowholes can be reliably reduced.

In addition, the galvanized steel sheet may be one of an electric galvanized steel sheet, a hot-dip galvanized steel sheet, and a galvannealed steel sheet.

Furthermore, the base steel sheet comprising the galvanized steel sheet preferably contains at least one of, by mass %, 0.2 to 0.9% of Cr and 0.1 to 0.2% of Mo.

Next, according to another aspect of the present disclosure, a method of welding giga steel, or the like, using the welding wire, will be described.

In the present disclosure, a method of gas-shielded arc welding of a welding base material using the welding wire, is provided, wherein, 5 to 20% of $CO_2$ is mixed with Ar as protective gas during the welding and used, and when a thickness of the welding base material is t (mm), welding may be performed so that a range of a welding heat input Q (kJ/cm), defined by the following Relational Expression 2, satisfies 1.15t≤Q≤1.6t.

$$Q=(I \times E) \times 0.048/\upsilon$$ [Relational Expression 2]

Here, in Relational Expression 2, I, E, and υ represent a welding current [A], a welding voltage [V], and a welding speed (cm/min), respectively.

The present disclosure is not particularly limited in a specific form (welding posture) of welding, and may be applied, for example, to lap fillet welding in a form of an overlap joint or fillet welding of a T-joint.

In addition, the type of shielding gas used is not particularly limited, and 100% $CO_2$ gas, Ar+20$CO_2$ gas, Ar+10% $CO_2$ gas, Ar+5% $CO_2$ gas, Ar+2% $O_2$ gas, and the like, may be used as the shielding gas. However, in particular, when Ar+5-20% $CO_2$ is used as the shielding gas, a remarkable effect of the present disclosure can be exhibited. That is, in the present disclosure, in order to secure tensile strength of 1 GPa or more in a welded portion without fracturing the welded metal or a fusion line, it is preferable to mix 5 to 20% of $CO_2$ with Ar as a protective gas during the welding.

In addition, when a thickness of the welding base material is t (mm), it is necessary that a range of a welding heat input Q (kJ/cm) defined by the Relational Expression 2 above satisfies 1.15t≤Q≤1.6t. If the welding heat input Q value is less than 1.15t, there is a concern that the strength and toughness of the welded metal of giga-grade steel material and a coarse grained heat affected zone may be insufficient. Conversely, if the welding heat input Q value exceeds 1.6t, there is a problem that not only insufficient strength of the welded metal and a decrease in the strength of a weld heat-affected zone become excessive, but also a back bead and melting down may easily occur in the welded portion, resulting in a defect.

In addition, in the present disclosure, the welding wire may use a solid wire having a diameter of 0.9 to 1.2 mm, and the description of the welding base material is as described above.

As described above, in the present disclosure, the contents of Cr, Mo, Si and Mn are controlled so as to satisfy the above Relational Expression 1. In addition, by suppressing the Cr content in the welding wire relatively high within a range of 4.0 to 5.2%, and at the same time, suppressing the Si content in the welding wire as low as 0.001 to 0.1%, it is possible to secure sufficient strength of the welded portion, and secure slag reduction and porosity at the same time.

MODE FOR INVENTION

Hereinafter, the present disclosure will be described in detail through Examples.

Example 1

After vacuum melting an ingot having composition components illustrated in Table 2 below, a wire was prepared by annealing after being drawn at room temperature through hot rolling. Then, a Cu plating layer was formed on a surface of the wire, and at this time, it was plated so that a copper content is in a range of 0.15 to 0.36%, by mass % with respect to a total wire including a plating layer. Then, the copper-plated wire was drawn, and manufactured as a solid wire for welding having a diameter of 0.9 to 1.2 mm.

Using the solid wire manufactured as described above, each of galvanized steel sheets having tensile strength of 1050 MP grade using a steel material No. 1, which is a welding base material in Table 1 below, as a base steel sheet, was welded by overlap joint welding. In this case, for comparison, overlap joint welding was performed using the above-described galvanized steel sheet using wires Nos. 5, 7, 12, 34 and 36 of Table 2 below as a welding base material. Furthermore, overlap joint welding was performed using a galvannealed steel sheet as a welding base material.

Meanwhile, in this case, a galvanized or galvannealed steel sheet used is obtained by performing double-sided galvanizing to a base material steel sheet, and a thickness of the base material steel sheet was 2.0 mm, and a plating amount of each of the galvanized and galvannealed steel sheet was 100 $g/m^2$ and 45 $g/m^2$ per side.

In addition, standard conditions for performing welding were applied with mixed shielding gas of Ar+20% $CO_2$ (flow rate 20l/min), and two identical steel plates were welded with a wire protrusion length of 15 mm, a pulse MAG and a welding speed of 80 cm/min as an overlap joint portion without a gap. In this case, a Q (kJ/cm) value defined by Relational Expression 2 as described above was 1.5 to 3.4.

Figure 3:
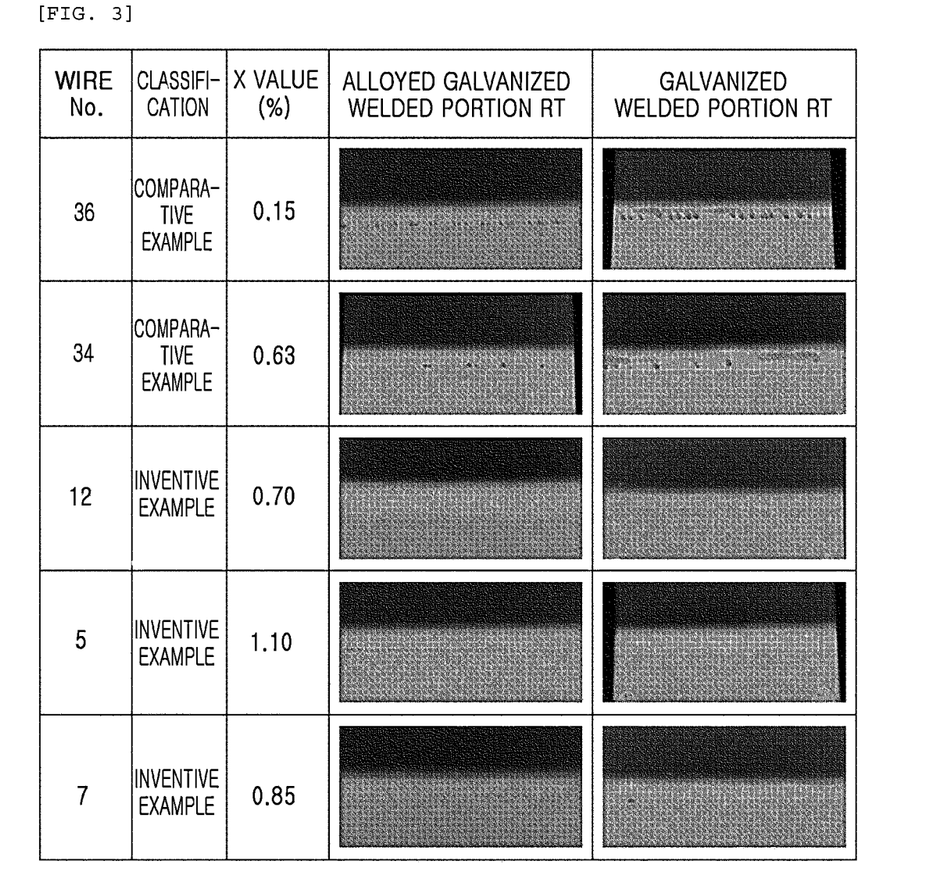
FIG. 3 is a Radiographic Test (RT) photograph for each welded portion obtained after performing overlap joint welding with a galvanized steel sheet or overlap joint welding with a galvannealed steel sheet using wires Nos 5, 7, 12, 34 and 36 of Table 2, in Example 1 of the present disclosure.

After solidification of the welded metal obtained by the above-mentioned overlap joint welding, observation of a bead appearance of the welded portion, an RT test to investigate occurrence of blowholes, hardness measurement and static/dynamic tensile test, and the like were conducted, and evaluation results thereof are shown in Table 2-3 and FIG. 3.

In this case, a case in which average hardness of the welded metal was 370 to 400 as Vickers hardness (Hv, load 500$gf$, measured at 0.2 mm intervals) was evaluated as ○ (pass), and a case thereof was 330 to 370 was Δ, and a case of exceeding 400 or less than 300 was evaluated as X (fail). In addition, after a static tensile test (speed 10 mm/min) of the welded portion, a case in which the tensile strength is 1 GPa or more and a case in which a fracture location is not welded metal or a fusion line were evaluated as ○ (pass) was evaluated, and the others were evaluated as X (failed).

In addition, in the case of the RT test for the observation of the bead appearance and investigation of the blowhole of the above-described welded portion, for a bead of a central 50 mm length excluding a portion from a beginning and an end 50 mm among 150 mm of the weld bead, a bead surface and RT photograph were taken, so that an image was collected. The slag and blowhole portions were marked, a sum of areas of the marked portions was obtained, and the slag area ratio was calculated from the following Relational Expression 3 compared to a total image area.

Slag (or blowhole) area ratio (%)=[Sum of slag (or blowhole) portion area/total image area]×100   [Relational Expression 3]

In the evaluation of a situation of slag generation illustrated in Table 2 below, a reference value of a slag area ratio was 1%, and a case in which the reference value of the slag area ratio is 1% or less was evaluated as ○ (pass), and the others were evaluated as X (fail). This is a target standard set to completely omit post-slag removal treatment processes in a welded portion such as separate pickling or mechanical abrasive brushing (both pickling and brushing if necessary) after welding to improve plating adhesion and corrosion resistance after plating when manufacturing parts.

In addition, when evaluating the blowhole occurrence situation, a case in which the reference value of the blowhole area ratio is 1% or less was evaluated as ○ (pass) and the others was evaluated as X (fail), based on the ISO 5817 standard. In the case of a high-strength steel material having tensile strength of 590 MPa or more, when a blowhole area ratio of the weld bead generally exceeds 5%, there is a concern for a sudden decrease in the static strength and fatigue strength of the welded portion. In particular, in the case of a giga-grade steel material having tensile strength of 1 GPa or more, a decrease in strength of the welded metal due to an increase in the blowhole area ratio of the weld bead becomes more sensitive, so this is a target standard set to completely prevent this.

In addition, for an evaluation of the brittleness of the welded metal obtained using the wires and an simulation evaluation of the high-speed collision situation of a front part, a high-speed tensile test was performed under low-speed (3.6 km/h) and high-speed (54 km/h) conditions, that is, tensile speed of 1 m/s and 15 m conditions, to a confirm a fracture location. A maximum load value in this case was compared with the physical properties of the steel material. In this case, a case in which no fracture occurred in the welded metal, and a maximum load value of the welded portion under high-speed conditions is 80% or more compared to the base material was evaluated as ○ (pass), and the others were evaluated as X (fail). When these standards are satisfied, it was determined that robustness of the welded portion can be sufficiently secured in the high-speed collision situation of front parts of automobiles.

TABLE 1

| Steel material No. | Chemical component of Steel material (welding base material) (mass %) | | | | | | | |
|---|---|---|---|---|---|---|---|---|
| | C | Si | Mn | P | S | Cr | Mo | Fe |
| 1 | 0.070 | 1.100 | 2.10 | 0.009 | 0.001 | 0.90 | — | Remainder |
| 2 | 0.090 | 0.900 | 2.00 | 0.009 | 0.001 | 0.20 | 0.20 | Remainder |

TABLE 2

| Wire No. | Classification | Chemical component for welding wire (mass %) | | | | | | X value (%) | Average hardness | Tensile strength | Fracture location |
|---|---|---|---|---|---|---|---|---|---|---|---|
| | | C | Si | Mn | Ni | Cr | Mo | | | | |
| 1 | Inventive example | 0.085 | 0.030 | 1.75 | — | 4.20 | 0.48 | 0.83 | ○ | ○ | ○ |
| 2 | Inventive example | 0.085 | 0.002 | 1.70 | — | 4.90 | 0.50 | 0.99 | ○ | ○ | ○ |
| 3 | Inventive example | 0.080 | 0.010 | 1.75 | — | 5.00 | 0.50 | 0.98 | ○ | ○ | ○ |
| 4 | Inventive example | 0.090 | 0.040 | 1.70 | — | 4.00 | 0.45 | 0.76 | ○ | ○ | ○ |

TABLE 2-continued

| Wire No. | Classification | Chemical component for welding wire (mass %) | | | | | | X value (%) | Average hardness | Tensile strength | Fracture location |
|---|---|---|---|---|---|---|---|---|---|---|---|
| | | C | Si | Mn | Ni | Cr | Mo | | | | |
| 5 | Inventive example | 0.080 | 0.010 | 1.70 | — | 5.00 | 0.62 | 1.10 | ○ | ○ | ○ |
| 6 | Inventive example | 0.100 | 0.001 | 1.60 | — | 4.00 | 0.40 | 0.80 | ○ | ○ | ○ |
| 7 | Inventive example | 0.085 | 0.020 | 1.75 | — | 4.20 | 0.48 | 0.85 | ○ | ○ | ○ |
| 8 | Inventive example | 0.085 | 0.085 | 1.70 | — | 4.90 | 0.50 | 0.79 | ○ | ○ | ○ |
| 9 | Inventive example | 0.080 | 0.080 | 1.75 | — | 5.00 | 0.50 | 0.84 | ○ | ○ | ○ |
| 10 | Inventive example | 0.090 | 0.090 | 1.70 | — | 4.50 | 0.48 | 0.72 | ○ | ○ | ○ |
| 11 | Inventive example | 0.080 | 0.060 | 1.70 | — | 5.00 | 0.65 | 1.01 | ○ | ○ | ○ |
| 12 | Inventive example | 0.100 | 0.040 | 1.60 | — | 4.00 | 0.40 | 0.70 | ○ | ○ | ○ |
| 13 | Inventive example | 0.085 | 0.100 | 1.85 | — | 5.00 | 0.65 | 0.93 | ○ | ○ | ○ |
| 14 | Inventive example | 0.080 | 0.080 | 1.90 | — | 5.00 | 0.40 | 0.73 | ○ | ○ | ○ |
| 15 | Inventive example | 0.087 | 0.090 | 1.88 | — | 4.90 | 0.50 | 0.80 | ○ | ○ | ○ |
| 16 | Inventive example | 0.082 | 0.050 | 1.90 | — | 5.00 | 0.65 | 1.04 | ○ | ○ | ○ |
| 17 | Inventive example | 0.085 | 0.040 | 1.72 | — | 5.20 | 0.54 | 0.97 | ○ | ○ | ○ |
| 18 | Inventive example | 0.15 | 0.040 | 1.70 | — | 4.80 | 0.50 | 0.89 | ○ | ○ | ○ |
| 19 | Comparative example | 0.075 | 0.010 | 1.07 | — | 1.37 | 0.56 | 0.66 | x | x | x |
| 20 | Comparative example | 0.081 | 0.030 | 1.90 | — | 1.45 | 0.54 | 0.62 | x | x | x |
| 21 | Comparative example | 0.087 | 0.020 | 1.82 | — | 5.20 | 0.67 | 1.15 | x | x | x |
| 22 | Comparative example | 0.092 | 0.005 | 1.88 | — | 5.80 | 0.62 | 1.19 | x | x | x |
| 23 | Comparative example | 0.092 | 0.040 | 1.89 | — | 5.60 | 0.72 | 1.20 | x | x | x |
| 24 | Comparative example | 0.070 | 0.860 | 1.53 | — | — | — | −2.25 | x | x | x |
| 25 | Comparative example | 0.070 | 0.490 | 1.02 | — | — | — | −1.92 | x | x | x |
| 26 | Comparative example | 0.050 | 0.510 | 1.37 | 2.640 | 0.16 | 0.47 | −1.00 | x | x | x |
| 27 | Comparative example | 0.070 | 0.270 | 1.37 | 2.880 | 0.50 | 0.30 | −0.44 | x | x | x |
| 28 | Comparative example | 0.080 | 0.530 | 1.68 | 1.400 | 0.05 | 0.24 | −1.02 | x | x | x |
| 29 | Comparative example | 0.100 | 0.800 | 1.80 | 1.900 | 0.33 | 0.54 | −1.20 | x | x | x |
| 30 | Comparative example | 0.075 | 0.59 | 1.07 | — | 1.37 | 0.56 | −1.51 | x | x | x |
| 31 | Comparative example | 0.090 | 0.45 | 0.47 | 0.060 | 4.97 | 0.51 | −2.82 | Δ | x | x |
| 32 | Comparative example | 0.075 | 0.02 | 1.63 | — | 1.17 | 0.48 | 0.55 | x | x | x |
| 33 | Comparative example | 0.088 | 0.31 | 1.90 | — | 4.80 | 0.45 | 0.28 | x | x | x |
| 34 | Comparative example | 0.010 | 0.16 | 1.75 | — | 4.90 | 0.51 | 0.63 | x | x | x |
| 35 | Comparative example | 0.095 | 0.22 | 1.82 | — | 5.00 | 0.55 | 0.57 | x | x | x |
| 36 | Comparative example | 0.099 | 0.38 | 1.87 | — | 4.70 | 0.49 | 0.15 | x | x | x |
| 37 | Comparative example | 0.087 | 0.42 | 1.75 | — | 5.00 | 0.46 | 0.00 | x | x | x |

*In Table 1, the remaining components are Fe and unavoidable impurities.

TABLE 3

| Wire No. | Classification | X value (%) | Galvannealed blowhole area ratio (%) | Galvanized blowhole area ratio (%) | Slag area ratio (%) | High-speed tensile property |
|---|---|---|---|---|---|---|
| 1 | Inventive example | 0.83 | ○ | ○ | ○ | ○ |
| 2 | Inventive example | 0.99 | ○ | ○ | ○ | ○ |
| 3 | Inventive example | 0.98 | ○ | ○ | ○ | ○ |
| 4 | Inventive example | 0.76 | ○ | ○ | ○ | ○ |
| 5 | Inventive example | 1.10 | ○ | ○ | ○ | ○ |
| 6 | Inventive example | 0.80 | ○ | ○ | ○ | ○ |
| 7 | Inventive example | 0.85 | ○ | ○ | ○ | ○ |
| 8 | Inventive example | 0.79 | ○ | ○ | ○ | ○ |
| 9 | Inventive example | 0.84 | ○ | ○ | ○ | ○ |
| 10 | Inventive example | 0.76 | ○ | ○ | ○ | ○ |
| 11 | Inventive example | 1.01 | ○ | ○ | ○ | ○ |
| 12 | Inventive example | 0.70 | ○ | ○ | ○ | ○ |
| 13 | Inventive example | 0.93 | ○ | ○ | ○ | ○ |
| 14 | Inventive example | 0.73 | ○ | ○ | ○ | ○ |
| 15 | Inventive example | 0.80 | ○ | ○ | ○ | ○ |
| 16 | Inventive example | 1.01 | ○ | ○ | ○ | ○ |
| 17 | Inventive example | 0.97 | ○ | ○ | ○ | ○ |
| 18 | Inventive example | 0.89 | ○ | ○ | ○ | ○ |
| 19 | Comparative example | 0.66 | ○ | ○ | ○ | x |
| 20 | Comparative example | 0.62 | ○ | ○ | ○ | x |
| 21 | Comparative example | 1.15 | ○ | ○ | ○ | x |
| 22 | Comparative example | 1.19 | ○ | ○ | ○ | x |
| 23 | Comparative example | 1.20 | ○ | ○ | ○ | x |
| 24 | Comparative example | -2.25 | x | x | x | x |
| 25 | Comparative example | -1.92 | x | x | x | x |
| 26 | Comparative example | -1.00 | x | x | x | x |
| 27 | Comparative example | -0.44 | x | x | x | x |
| 28 | Comparative example | -1.02 | x | x | x | x |
| 29 | Comparative example | -1.20 | x | x | x | x |
| 30 | Comparative example | -1.51 | x | x | x | x |
| 31 | Comparative example | -2.82 | x | x | x | x |
| 32 | Comparative example | 0.55 | ○ | ○ | ○ | x |
| 33 | Comparative example | 0.28 | x | x | x | x |
| 34 | Comparative example | 0.63 | x | x | x | x |
| 35 | Comparative example | 0.57 | x | x | x | x |
| 36 | Comparative example | 0.15 | x | x | x | x |
| 37 | Comparative example | 0.00 | x | x | x | x |

Figure 1:
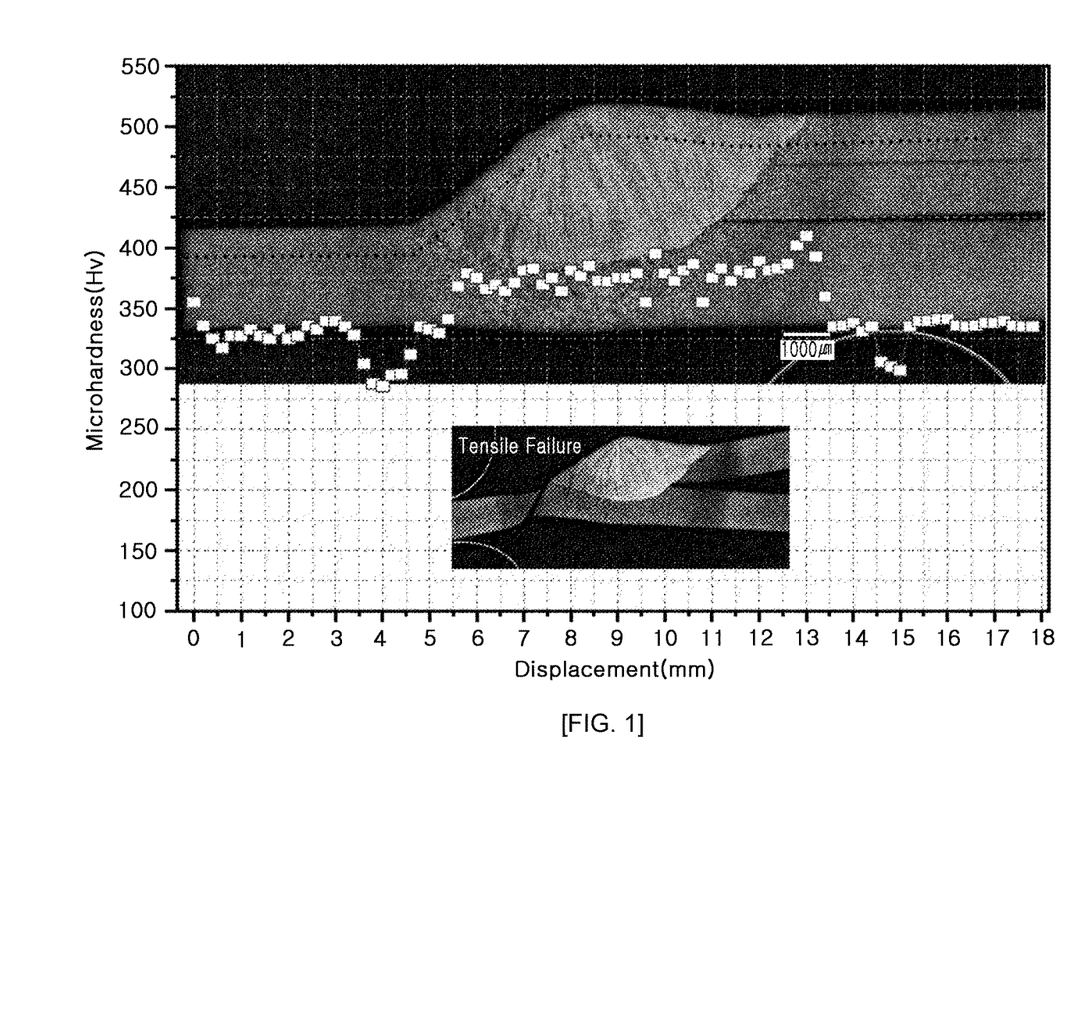
FIG. 1 is a photograph illustrating a cross-sectional structure and hardness distribution of a welded portion obtained from the Inventive example [X (%)=0.85, Q(kJ/cm)=2.6] welded using a wire No. 7 in Table 2, and a cross-sectional structure in a fracture location after static tensile test of the welded portion aforementioned, in Example 1 of the present disclosure.

As can be seen from Table 2-3, it can be confirmed that, in all wire Nos. 1 to 18 in which the X value defined by Relational Expression 1 as well as the solid wire composition component satisfies a range of 0.7 to 1.1%, average hardness of the welded portion, and tensile strength and a fracture location of the welded portion meet the required standards. FIG. 1 is a photograph illustrating a cross-sectional structure and hardness distribution of a welded portion obtained from the Inventive Example [X (%)=0.85, Q(kJ/cm)=2.6] welded using wire No. 7 in Table 2 above, and a cross-sectional structure of a fracture location after static tensile test of the welded portion aforementioned.

On the other hand, in the case of wire Nos. 19 to 23, the Si content is controlled to be 0.001 to 0.1% or less, and as shown in Table 3, although the blowhole and slag area ratios were at acceptable levels, the above-mentioned value of X was out of the required range, so the average hardness, tensile strength, fracture location, and high-speed tensile properties of the welded metal were unsatisfactory. In particular, in the case of wire Nos. 21 to 23, the average hardness of the welded metal portion exceeded 400, and as a result thereof, fracture occurred in the welded metal during static or high-speed tensile tests. This was determined to be as a result of excessively increased brittleness because the fraction of martensite in the welded metal exceeded 50%.

In addition, in the case of wire Nos. 24 to 31, the value of X is widely outside of a range of 0.7 to 1.1%, and as a result thereof, as shown in Tables 2 and 3, it did not meet the standards in all items except that the average hardness of the welded metal portion of the wire No. 31 is determined as Δ.

Figure 2:
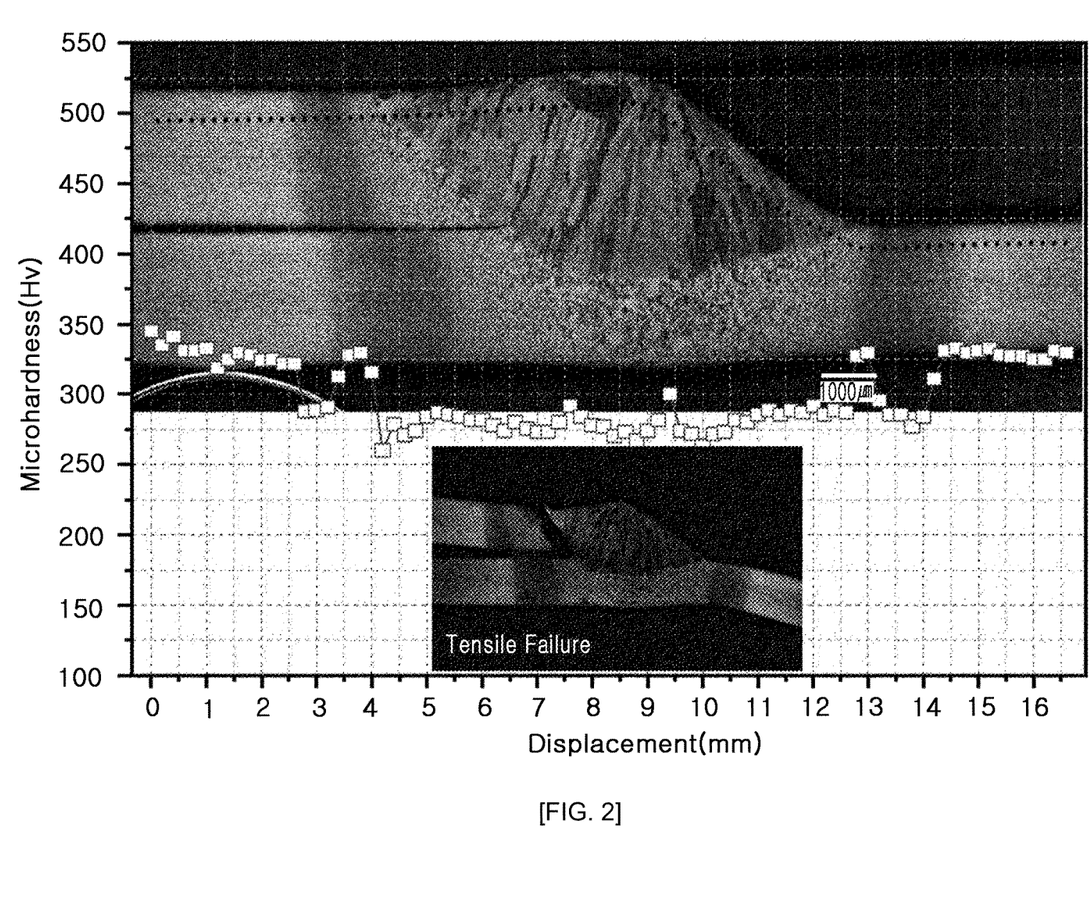
FIG. 2 is a photograph illustrating a cross-sectional structure and hardness distribution of a weld portion obtained from Comparative Example [X (%)=0.55, Q(kJ/cm)=2.6] welded using a wire No. 2 in Table 2, and a cross-sectional structure in a fracture location after static tensile test of the welded portion aforementioned, in Example 1 of the present disclosure.

In the case of a wire No. 32, the Si content was controlled to be 0.001 to 0.1% or less, and as shown in Table 3, the blowhole and slag area ratios were excellent, respectively, but as shown in Table 2, the average hardness of the welded metal was a Vickers hardness of 320, which was too low as compared to the base material of the steel material, so the tensile strength of the welded portion was much lower than the base material, and a fracture location was also a welded metal portion and did not meet the required standards. FIG. 2 is a photograph illustrating a cross-sectional structure and hardness distribution of a welded portion obtained from Comparative Example [X (%)=0.55, Q(kJ/cm)=2.6] welded using a wire No. 32 in Table 2 below, and a cross-sectional structure of a fracture location after static tensile test of the welded portion aforementioned.

In addition, wires Nos. 33 to 37 are cases in which a X value does not satisfy the above-described appropriate range, so that an average hardness value of the welded metal portion exceeds 400, and the Si content exceeds 0.1%, so it can be confirmed that blowhole and slag area ratio do not meet the standards, in addition to the tensile properties of the welded portion. In particular, a portion thereof illustrates the result of being fractured at the fusion line during tension, confirming that the brittleness of the welded metal portion is increased.

Meanwhile, as described above, FIG. 3 is a radiographic test (RT) photograph for each welded metal portion obtained after overlap joint welding with the galvanized steel sheet described above using wire Nos. 5, 7, 12, 34, and 36 in Table 2, and overlap joint welding with a galvannealed steel sheet.

As shown in FIG. 3, in the case of the welded portion obtained using wire Nos. 34 and 36 in which the Si content is outside of a range of 0.001 to 0.1%, and the above-described X value is also outside of a range of 0.7 to 1.1%, as can be seen from the RT results, the blowhole area ratio was greatly increased. On the other hand, in the welded portion obtained using wire Nos. 5, 7, and 12, satisfying an appropriate range of the present disclosure, it can be confirmed that very good results can be obtained in which the blowhole area ratio is within 1%.

Example 2

TABLE 4

| Steel material No. | Wire No. | Classification | Heat input amount (kJ/cm) | Tensile strength in welded portion (MPa) | Microstructure property of welded metal | | | |
|---|---|---|---|---|---|---|---|---|
| | | | | | M fraction (%) | B/γ fraction (%) | Average effective grain size (μm) | Grain fraction having high angle grain boundary of 47° or more (%) |
| 1 | 7 | Comparative example | 1.6 | 950 | 50 | 41/9 | 1.5 | 27 |
| 1 | 7 | Comparative example | 2.0 | 958 | 46 | 47/7 | 1.8 | 29 |
| 1 | 32 | Comparative example | 3.2 | 930 | 14 | 80/6 | 4.4 | 24 |
| 1 | 7 | Inventive example | 2.3 | 1009 | 43 | 52/5 | 2.2 | 35 |
| 1 | 7 | Inventive example | 2.6 | 1022 | 38 | 58/4 | 2.6 | 37 |
| 1 | 7 | Inventive example | 2.8 | 1017 | 32 | 64/4 | 2.8 | 36 |
| 1 | 7 | Inventive example | 3.2 | 1015 | 30 | 66/3 | 2.9 | 36 |
| 2 | 12 | Inventive example | 2.4 | 1008 | 42 | 53/5 | 2.3 | 38 |
| 2 | 12 | Inventive example | 2.6 | 1021 | 3 7 | 59/4 | 2.5 | 35 |
| 2 | 12 | Inventive example | 2.8 | 1020 | 31 | 66/3 | 2.9 | 39 |
| 2 | 12 | Inventive example | 3.2 | 1018 | 30 | 68/2 | 3.0 | 37 |

*In Table 4, M refers to martensite, B refers to bainite, and γ refers to retained austenite.

In Table 4, a steel material No. refers to the steel material No. in Table 1, and a wire No. refers to the wire No. in Table 2.

Welded metal was obtained by overlap joint welding of the steel material of Table 4 by using the solid wires as shown in Table 4. In this case, the steel material was a galvanized steel sheet with zinc plating on a surface thereof, and a thickness of the steel sheet was 2.0 mm. Specific welding conditions during the present welding were the same as in Example 1, and only a welding heat input was applied differently for a combination of each wire and steel material as shown in Table 4. Tensile strength of each welded metal obtained by applying different amounts of welding heat input was measured and shown in Table 4 above, and characteristics of a microstructure of the welded metal were measured and also shown in Table 4 above.

Meanwhile, in the present disclosure, the above tensile strength was an average value of each measured value obtained after performing a tensile test by processing three tensile specimens of JIS-5 standard from welded specimens of the overlap joint portion at a center of the bead, installing an extensometer therein under the condition of having a tensile speed of 10 mm/min.

A microstructure of the welded portion was measured from the result of performing Lepera etching on the welded metal portion, taking an optical picture, and analyzing each low-temperature transformation phase divided by color difference, and an average effective grain size and a grain fraction having high angle grain boundary of 47° or more were also measured through EBSD analysis.

As shown in Table 4, Inventive examples in which a Q value according to Relation 2 satisfies a range of 2.3 to 3.2 kJ/cm based on a thickness of the steel sheet base material of 2.0 mm obtained a result that the tensile strength in the welded portion exceeded 1 GPa, the tensile strength ratio in this case compared to the steel sheet base material of the welded portion was also 95-96%.

On the contrary, it can be seen that Comparative Examples in which the value of Q is less than 2.3 kJ/cm exhibits that the tensile strength of the welded portion is less than 1 GPa. When the Q value exceeds 3.2 kJ/cm, back beads are formed or melting down occurs due to excessive welding heat input compared to the thickness of the steel sheet, so it was excluded from this analysis.

Meanwhile, when the X value defined by the above-described Relation 1 is in a range of 0.7 to 1.1%, it is possible to develop upper and lower bainite in a temperature range of about 400 to 250° C. according to the decrease of the beginning temperature of low temperature transformation, in particular, compared to martensite alone, a large number of grains having high angle grain boundary developed in an inter-locking structure within prior austenite grains, and mixed with martensite, so it was judged to be effective in improving strength and toughness.

Figure 4:
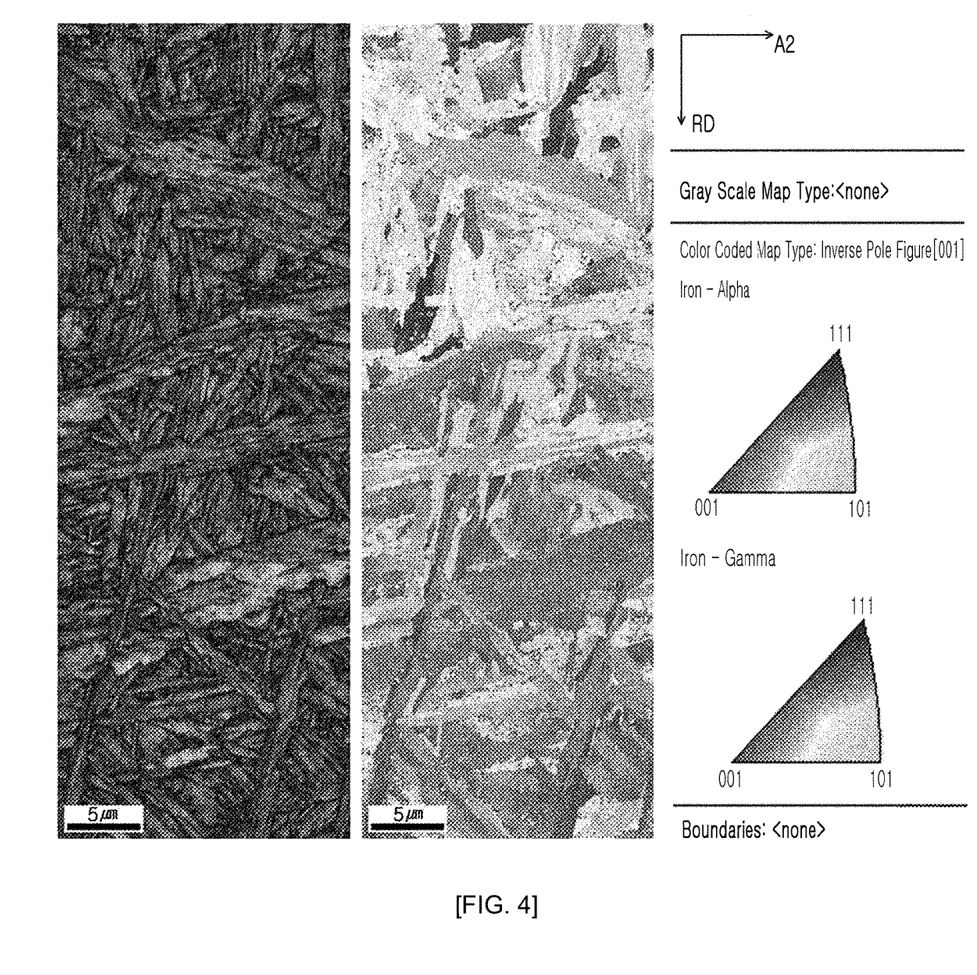
FIG. 4 is an EBSD structure photograph and Inverse Pole Figure of welded metal obtained from Inventive Example [X (%)=0.85, Q(kJ/cm)=3.2] in which a No. 7 wire and a No. 1 steel material in Table 4 are combined and welded, in Example 2 in the present disclosure.
Figure 5:
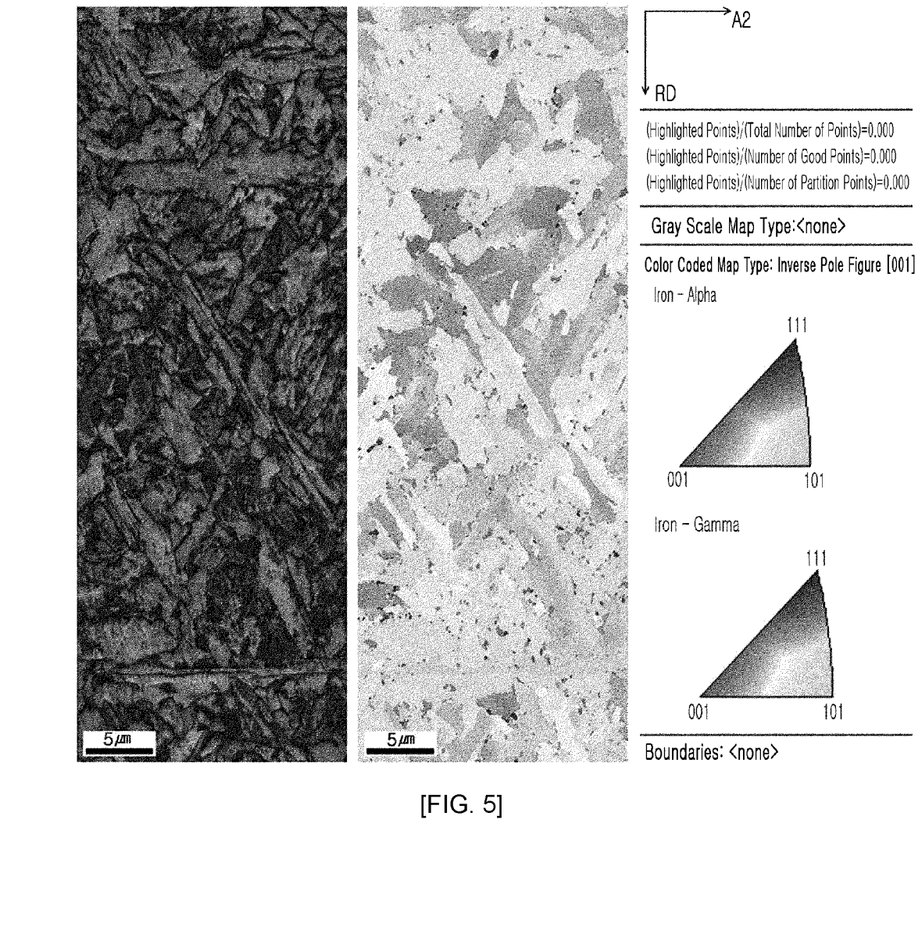
FIG. 5 is a EBSD structure photograph and Inverse Pole Figure of welded metal obtained from Comparative Example [X (%)=0.55, Q(kJ/cm)=3.2] in which a No. 32 wire and a No. 1 steel material in Table 4 are combined and welded, in Example 2 of the present disclosure.

FIG. 4 is an EBSD structure image and Inverse Pole Figure of the welded metal obtained from Inventive example in which a No. 7 wire and a No. 1 steel material in Table 4 are combined and welded, this point is well explained. On the other hand thereto, FIG. 5 is an EBSD structure image and Inverse Pole Figure of the welded metal obtained from Comparative example in which a No. 32 wire and a No. 1 steel material in Table 4 were combined and welded, and it can be seen that the welding heat input is within the range of the present disclosure, but a desired microstructure cannot be obtained if the X value is out of the range of the present disclosure.

Figure 6:
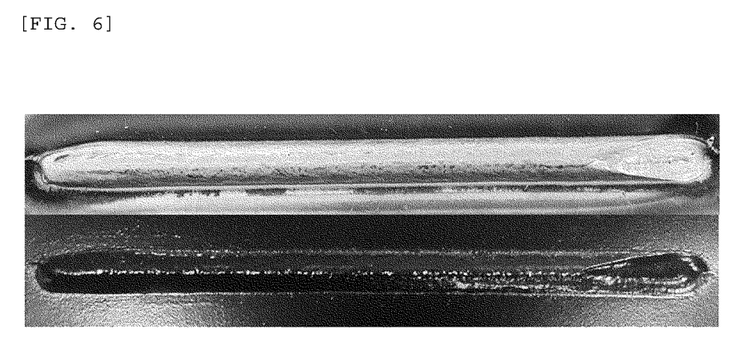
FIG. 6 is a welding bead appearance photograph obtained from Inventive Example [X (%)=0.85, Q(kJ/cm)=2.6] in which a No. 7 wire and a No. 1 steel material in Table 4 are combined and welded, and an appearance photograph after plating by omitting post-treatment processes such as pickling, brushing, or the like to remove slag from the welded portion, in Example 2 of the present disclosure.

Meanwhile, FIG. 6 is a welding bead appearance photograph obtained from Inventive example[X (%)=0.85, Q(kJ/ cm)=2.6] in which a No. 7 wire and a No. 1 steel material in Table 4 are combined and welded, and an appearance image after plating by omitting post-treatment processes such as pickling or brushing to remove slag from the welded portion. In particular, it can be confirmed that the slag area ratio of the weld bead is significantly reduced to less than 1% even when 20% carbon dioxide gas is mixed as shield gas, and thus, it can be confirmed that the platability of the welded portion and the corrosion resistance after plating can be improved.

Figure 7A:
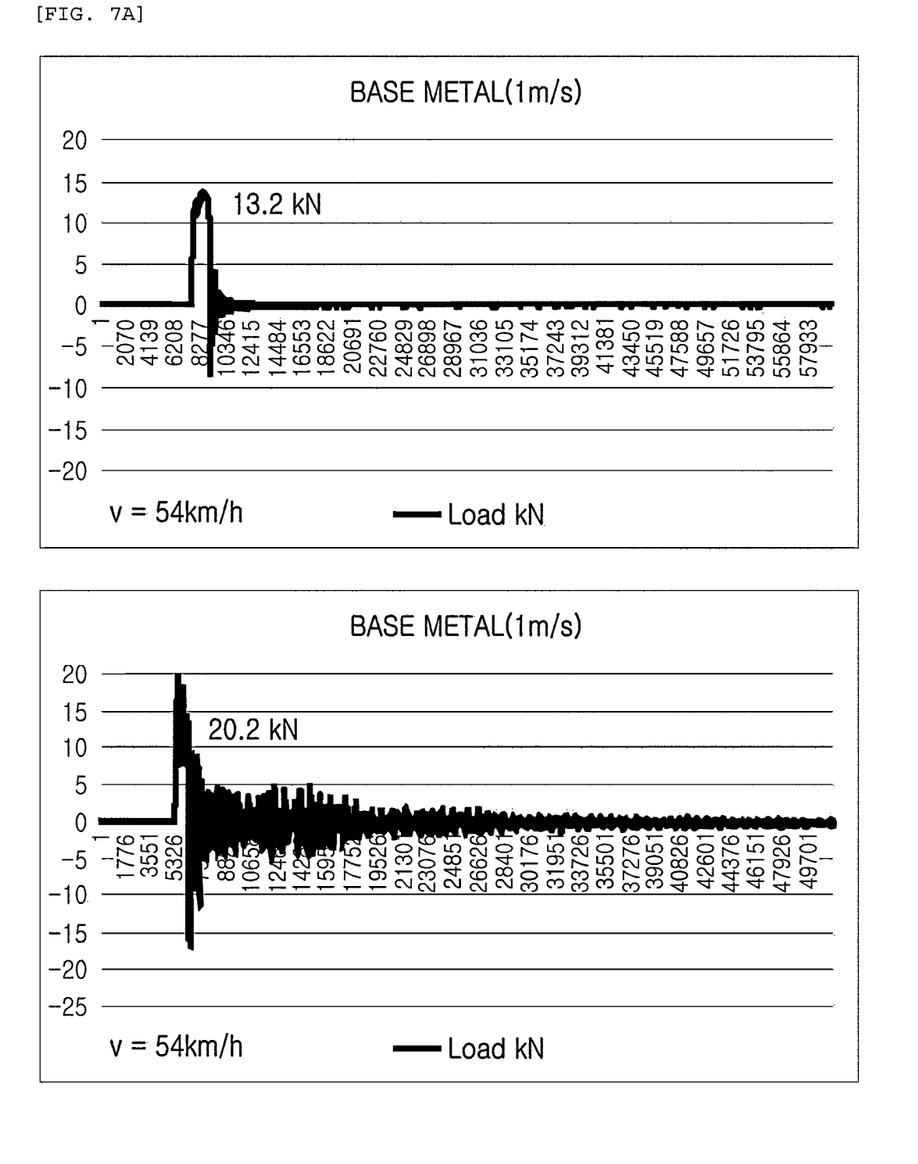
Figure 7B:
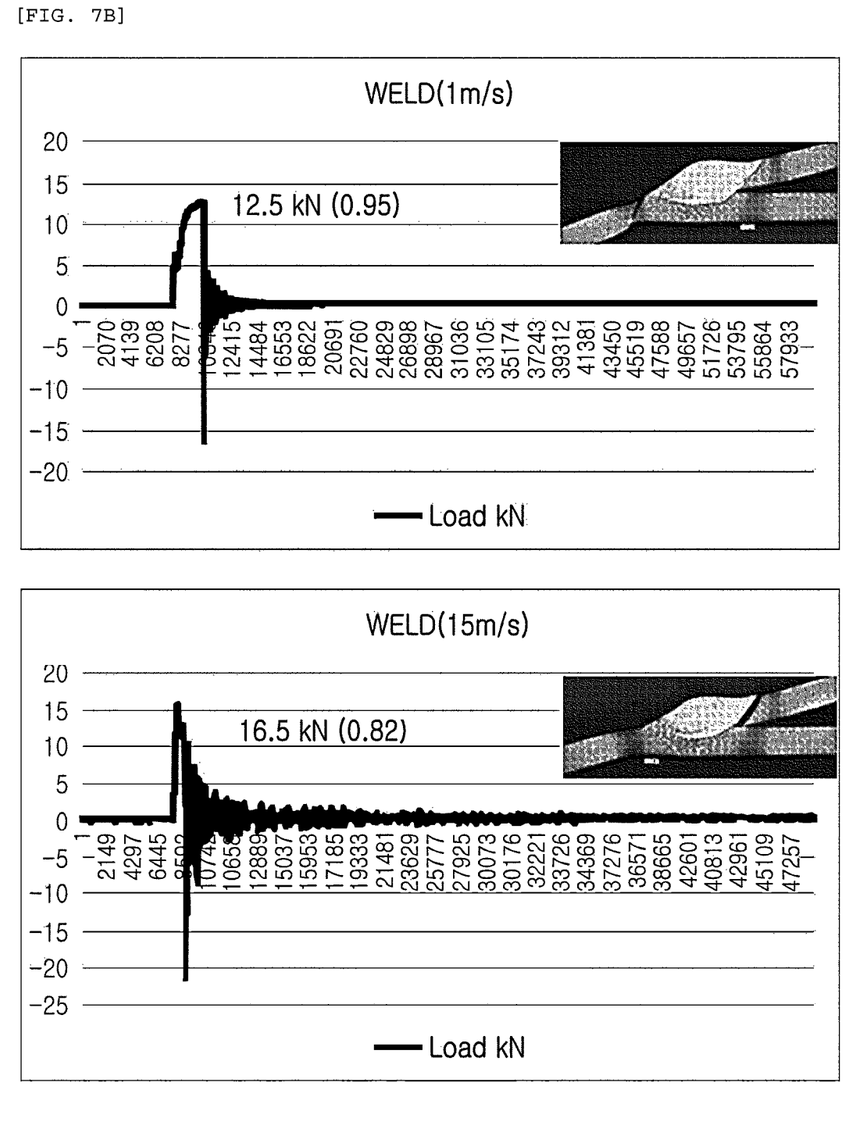

FIG. 7 (A-B) is a diagram illustrating a change in a load (b) of the welded portion in comparison with a change in a load (a) of the steel material, which is a welding base material, when a high-speed tensile test (tensile speed of 1 m/s and 15 m/s, respectively) was performed by applying a load to the welded portion obtained from Inventive example [X (%)=0.85, Q(kJ/cm)=2.6] in which a No. 7 wire and a No. 1 steel material in Table 4 were combined and welded. Specifically, in a relatively low-speed collision (3.6 km/h) situation, a maximum load ratio of the welded portion to the steel plate base material was very good at 95%, and a result was confirmed that fracture did not occur in the welded metal or fusion line, and even in a high-speed collision (54 km/h) situation, the maximum load ratio of the welded portion to the steel plate base material was 82% compared to the base material of the steel sheet, and it can be confirmed that even in this case, the load ratio of the welded portion may be secured by 80% or more without fracturing of the welded metal. As a result of supporting the characteristics of the microstructure of the above-described welded metal, it can be seen that a gas-shielded arc weld portion of a giga-grade steel material having tensile strength of 1 GPa grade or more can be effectively obtained.

Hereinafter, the present disclosure will be described in more detail through examples. However, it should be noted that the following examples are for illustrative purposes only and are not intended to limit the scope of the present disclosure. The scope of the present disclosure may be determined by matters described in the claims and matters able to be reasonably inferred therefrom.

While example embodiments have been shown and described above, it will be apparent to those skilled in the art that modifications and variations could be made without departing from the scope of the present disclosure as defined by the appended claims.

The invention claimed is:

1. A gas-shielded arc welding wire comprising: by mass % of a whole wire, 0.08 to 0.15% of C; 0.001% to 0.1% of Si; 1.6 to 1.9% of Mn; 0.015% or less of P; 0.015% or less of S; 4.0 to 5.2% of Cr; 0.4 to 0.65% of Mo, and the remainder of Fe and unavoidable impurities, wherein a value X defined by the following Relational Expression 1 satisfies a range of 0.7 to 1.1%, $$X (\%)=[Cr]/10+[Mo]-4x[Si]/[Mn],$$
wherein, [Relational Expression 1]

in Relational Expression 1, [Cr], [Mo], [Si] and [Mn] represent mass % of each element.

2. The gas-shielded arc welding wire of claim 1, wherein a Cu plating layer is formed on a surface of the welding wire.

3. The gas-shielded arc welding wire of claim 2, wherein Cu comprising the Cu plating layer has a content of 0.4% or less (excluding 0%) by mass % of the total wire including the Cu plating layer.

4. The gas-shielded arc welding wire of claim 3, wherein Cu comprising the Cu plating layer has a content in a range of 0.1 to 0.3% by mass % of the total wire including the Cu plating layer.

5. The gas-shielded arc welding wire of claim 1, wherein the welding wire contains 4.2 to 4.9% of Cr, 0.45 to 0.48% of Mo, and 1.65 to 1.75% of Mn, respectively.

6. The gas-shielded arc welding wire of claim 1, wherein the welding wire has a Si content in a range of 0.04 to 0.08%.

7. The gas-shielded arc welding wire of claim 1, wherein the welding wire is a gas-shielded arc welding solid wire.

8. A welded structure having a welded portion obtained by welding two or more welding base materials using a welding wire according to claim 1,
wherein the welded portion has a microstructure comprising, by area %, 30 to 50% of martensite, 50 to 70% of bainite, and the remainder of less than 5% of retained austenite, the microstructure comprising the welded portion having an average effective grain size of 1 to 3 μm, and a grain fraction having high angle grain boundary of 47° or more of 35% or more.

9. The welded structure of claim 8, wherein at least one of the welding base materials is a galvanized steel sheet.

10. The welded structure according to claim 9, wherein the galvanized steel sheet is one of an electric galvanized steel sheet, a hot-dip galvanized steel sheet, and a galvannealed steel sheet.

11. The welded structure of claim 10, wherein a base steel sheet comprising the galvanized steel sheet contains, by mass %, at least one of Cr: 0.2 to 0.9% and Mo: 0.1 to 0.2%.

12. The welded structure of claim 8, wherein the welded portion has average hardness of 370 to 400 Hv, and a tensile strength of 1 GPa or more, which is 95% or more compared to the welding base material.

13. The welded structure of claim 8, wherein the welded portion has a high-speed tensile strength of 95% and 80% or more, respectively, compared to the base material at tensile speeds of 3.6 km/h and 54 km/h.

14. A method of gas-shielded arc welding of a welding base material using the welding wire according to claim 1,
wherein 5 to 20% $CO_2$ is mixed with Ar as a protective gas during the welding and used,
wherein, when a thickness of the welding base material is t (mm), welding is performed so that a range of a welding heat input Q (KJ/cm) defined by the following Relational Expression 2 satisfies 1.15t≤Q≤1.6t, $$Q=(I \times E) \times 0.048/\upsilon$$ [Relational Expression 2]

Here, in Relational Expression 2, I, E, and υ represent a welding current [A], a welding voltage [V], and a welding speed (cm/min), respectively.

15. The gas-shielded arc welding method of claim 14, wherein the welding wire is a solid wire having a diameter of 0.9 to 1.2 mm.

16. The gas-shielded arc welding method of claim 14, wherein the welding base material contains, by mass %, at least one of 0.2 to 0.9% of Cr and 0.1 to 0.2% of Mo.

17. The gas-shielded arc welding method of claim 14, wherein the welding base material is a galvanized steel sheet.

18. The gas-shielded arc welding method of claim 17, wherein the galvanized steel sheet is one of an electrogalvanized steel sheet, a hot-dip galvanized steel sheet, and a galvannealed steel sheet.

* * * * *